United States Patent [19]

Mower et al.

[11] Patent Number: 4,745,964

[45] Date of Patent: May 24, 1988

[54] STEAM TRAP AND DIVERTER APPARATUS

[75] Inventors: Joseph H. Mower, Carmel; Kevin B. Kline, Indianapolis, both of Ind.

[73] Assignee: ITT Corporation, New York, N.Y.

[21] Appl. No.: 99,415

[22] Filed: Sep. 21, 1987

[51] Int. Cl.⁴ ............................................. G05D 23/12
[52] U.S. Cl. .................................. 165/40; 236/93 A; 137/179
[58] Field of Search ............... 236/93 B, 99 R, 99 J; 137/119; 165/40

[56] References Cited

U.S. PATENT DOCUMENTS

| | | | |
|---|---|---|---|
| 1,859,504 | 5/1932 | Fielder | 236/93 A |
| 2,400,615 | 5/1946 | Warrick et al. | 236/93 A X |
| 3,136,337 | 6/1964 | Fox | 236/93 A X |
| 4,288,031 | 9/1981 | Hass | 236/93 A X |
| 4,456,167 | 6/1984 | Buter | 236/93 A X |

OTHER PUBLICATIONS

ITT Lawler Bulletin 21-4, (Tempering Valve).
ITT Hoffman Bulletin TB1, (Steam Tracing Trap).

Primary Examiner—William E. Tapolcai
Attorney, Agent, or Firm—Menotti J. Lombardi

[57] ABSTRACT

Apparatus is described having a steam inlet coupled to a steam trap set to discharge condensate at a first predetermined temperature to a condensate return line. A diverter valve is coupled in line to the steam trap to cause the condensate to be discharged at a second predetermined temperature out of an overheat condensate drain port and to close the discharge to the condensate return line.

20 Claims, 1 Drawing Sheet

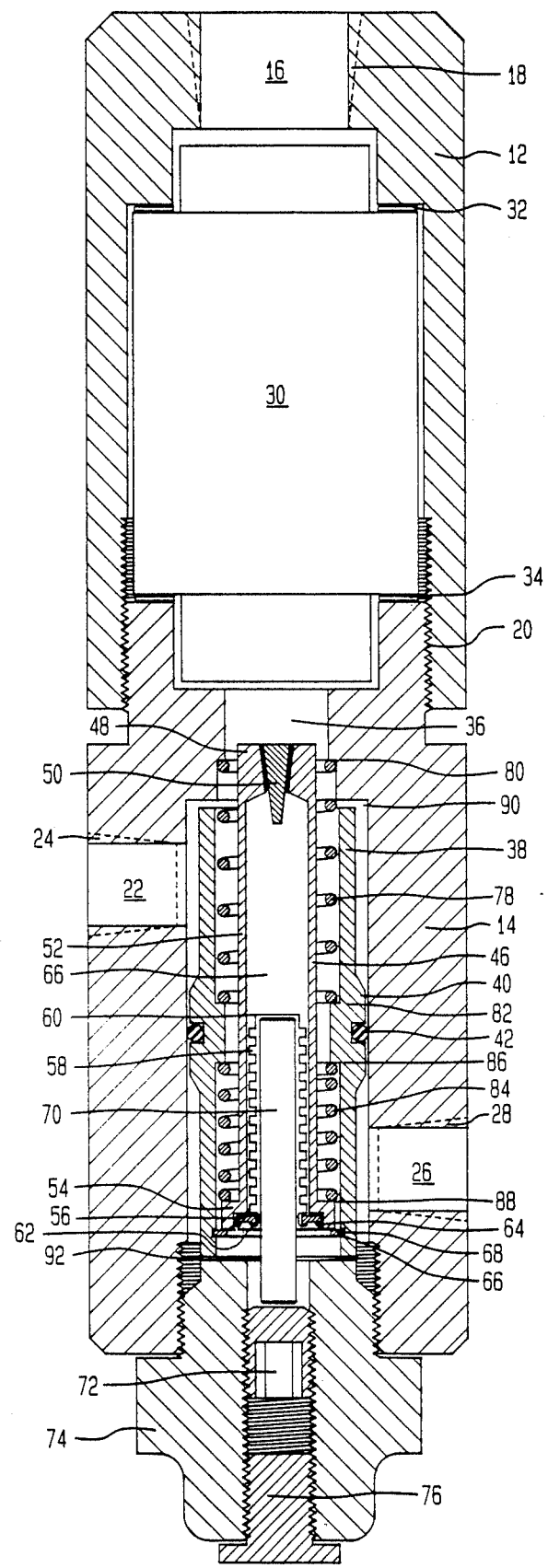

STEAM TRAP AND DIVERTER APPARATUS

BACKGROUND OF THE INVENTION

This invention relates to a steam trap and diverter apparatus, and more particularly an improved steam trap and diverter apparatus for condensate return systems.

Various steam traps are known in the prior art in which the steam traps discharge the high temperature condensate at or about the saturation temperature. In certain type steam traps, the discharge temperature of the condensate can be adjusted for the temperature under saturation to make use of the heat of the hot condensate and conserve energy.

Tempering valves are known in which a liquid filled copper thermostatic actuator is located in the valve mixing chamber where the tempered water flows over it. An increase in mix temperature causes the liquid to expand. This type of thermostat is linear in its expansion and exerts the highest possible operating force directly on the valve piston, reducing the hot water proportion and increasing the cold. The liquid filled copper thermostatic activator is sensitive to the slightest variation in temperature and reacts to divert the flow.

SUMMARY OF THE INVENTION

An object of the invention is to provide a steam trap and diverter apparatus for use in condensate return systems.

Another object of the invention is to provide an improved steam trap and diverter apparatus for use with fiberglass reinforced pipe condensate return system.

According to the broader aspects of the invention, the upper portion of the apparatus contains a steam trap set to discharge condensate at a predetermined temperature to the condensate line, and the lower portion of the apparatus contains a diverting valve responsive to the steam trap discharge to divert condensate to the overheat outlet up to another predetermined temperature at which temperature the diverting valve will open the overheat outlet and close the outlet to the condensate return line.

BRIEF DESCRIPTION OF THE DRAWING

Other objects, features and advantages of the present invention will become more fully apparent from the following detailed description of the preferred embodiment, the appended claims and the accompanying drawing which illustrates the steam trap and diverter valve apparatus according to the invention.

DETAILED DESCRIPTION OF THE PREFERRED EMBODIMENT

Referring now to the drawing, the steam trap and diverter apparatus according to the invention includes an upper housing 12 and a lower housing 14, which may be made from either brass or bronze. The interior of the housings are cylindrical and the exterior may be cylindrical or, for example, may be hexagonal to allow for easier wrenching. The upper housing 12 has an inlet opening 16 and female threads 18 for coupling to a condensate input line having condensate at a pressure from 50 to 150 psi and temperature from 190° to 375° F.

The lower housing 14 is coupled to the upper housing 12 by means of female and male threads 20. Housing 14 has a discharge opening 22 and female threads 24 for coupling to a condensate return line. In the application of the preferred embodiment, the return line is a fiberglass reinforced pipe. Normally the plastic pipe has a temperature limit in the 250° F. range. Thus it is important to prevent condensate at or exceeding this temperature from being returned to the system in the return line. Return of condensate at or exceeding the temperature limit of the return line pipe will cause damage to the pipe and a shut down of the system.

Housing 14 also has a discharge opening 26 and female threads 28 for coupling the condensate to an overheat waste drain at a predetermined temperature which in the preferred embodiment starts at approximately 200° F.

A temperature controlled steam trap 30, shown in outline form, is mounted and retained in housing 12 by means of coupling 20 between housing 12 and 14. Such a thermostatic steam trap may be obtained from ITT Hoffman, Indianapolis, Ind., Model TB1. The trap 30 is mounted between two ring sealing gaskets 32, 34. In the preferred embodiment trap 30 is set to discharge condensate entering inlet opening 16 into cavity 36 at a temperature of 190° F.±5° F.

Housing 14 contains the diverter valve apparatus according to the preferred embodiment of the invention. The diverter valve includes a stainless steel cylindrically shaped piston 38 having a hub portion 40 containing an O-ring 42 for slidably sealing the interface between the outer periphery of the hub and inner periphery of housing 14.

Mounted within piston 38 is cylindrically configured liquid expansion thermostat 44. The copper thermostat housing 46 includes an upper end portion 48 having a bronze or brass seal pin 50, a middle body portion 52, lower U-shaped portion 54, and an end cap 56. Also included within housing 46 is a cylindrically shaped brass or bronze bellows 58 having a closed end 60 and an end 62 spin formed and sealed over end cap 56. End cap 56 is soldered at 64 to the U-shaped portion 54 of housing 46. The cavity 66 within housing 46 is filled with a heat transfer fluid, which in the preferred embodiment is a mineral oil.

Piston 38 has a groove 66 in which is positioned a snap ring 68 for retaining the thermostat 44 in position. A brass adjusting rod 70 suitably adjusts the bellows 58 by means of adjusting nut 72, which is screwed in end nut 74. An end screw cap 76 closes end nut 74.

A first upper spring member 78 is retained between lip 80 in housing 14 and lip 82 on piston 38. A second lower spring member 84 is positioned between a second lip 86 on piston 38 and ledge 88 on portion 54 of thermostat 44.

The spring force of upper spring member 78 is lighter than the spring force of the lower spring member 84 which is preloaded to a force higher than the maximum force on the upper spring. An upper seal seat 90 formed between housing 14 and piston 38 is normally opened in the assembled first condition. A lower seal seat 92 formed between housing 14 and piston 38 is normally closed in the assembled first condition.

In operation in the first predetermined condition, steam trap 30 discharges condensate at approximately 190° F. into cavity 36. Because upper seal seat 90 is normally open, the condensate will flow from cavity 36 through seat 90 and out through discharge opening 22. No condensate will flow out of discharge opening 26 since seal seat 92 is normally closed and no condensate can pass O-ring 42. In a second predetermined condition, once the condensate temperature reaches approximately 200° F., liquid expansion begins in thermostat 44, this causes bellows 58 to start to contract causes an upward movement of thermostat housing 46 and by means of portion 54 forces lower spring 84 against piston lip 86 moving piston 38 upward to open seal seat 92 and allow condensate to flow out of discharge opening 26 to drain. In this second predetermined condition, condensate will flow through discharge openings 22 and 26.

At a third predetermined condition, at approximately 250° F., the liquid expansion will be at a maximum and the bellows 58 contracted or depressed a maximum amount and housing 46 will move upward, forcing spring 84 upward against lip 86 overcoming spring 78 fully closing seal seat 90 and fully opening seal seat 92. This stops all condensate from existing discharge opening 22 and diverts all condensate out the discharge opening 26. This protects the fiberglass pipe connected to discharge opening 22 from damage.

As the temperature of the condensate gradually reduces below 250°, the thermostat 44 will cause the piston to start moving downward, opening seal seat 90 and when the condensate finally stabilizes at approximately 190° F., seal seat 90 will be in its normally open position and seal seat 92 in its normally closed position.

There was described in connection with a preferred embodiment of the invention, apparatus including a steam trap and a thermostatic diverter valve. The upper portion of the apparatus has a steam trap set to discharge condensate at approximately 190° F., and the lower portion of the apparatus has a thermostatic diverter valve which allow condensate to be discharged out the condensate return line until a temperature of approximately 200° F. is reached. At this temperature, the valve begins to allow flow of the condensate to the discharge drain outlet and begins to close off the condensate return line. This process is completed by 250° F. when the condensate return line will be completely closed and the condensate discharge drain line completely open.

While we have described the principles of the invention in connection with specific apparatus, it is to be clearly understood that this description is made only by way of example and not as a limitation to the scope of the invention as set forth in the objects thereof and in the accompanying claims.

What is claimed is:

1. A steam trap and diverter valve apparatus comprising:
    an upper housing having a condensate input port;
    a steam trap mounted in said upper housing;
    a lower housing coupled to said upper housing and retaining said steam trap in said upper housing, said lower housing having a condensate return line port and a condensate discharge port;
    a diverter valve mounted in said lower housing including
    a cylindrical piston slidably mounted in said lower housing and having an upper sealing seat surface and a lower sealing seat surface, said upper sealing seat surface cooperating with a sealing surface in said lower housing to form an upper sealing seat,
    an upper spring member fixedly retained within an upper portion of said piston and an inner lip portion of said lower housing,
    an expansion thermostat mounted and retained within said piston and spaced from said steam trap,
    a lower spring member fixedly retained within a lower portion of said piston and an outer ledge portion of said thermostat, and
    means for adjusting said thermostat;
    end nut means for retaining said valve in said lower housing and having a surface cooperating with said piston to form said lower sealing seat; and
    said steam trap is set to discharge condensate at a first predetermined temperature into a cavity between said trap and said diverter valve, and at said first predetermined temperature said upper sealing seat is normally open and said lower sealing seat is normally closed, such that said condensate is discharged through said condensate return line port.

2. The apparatus of claim 1 wherein at a second predetermined temperature said expansion thermostat causes movement of said piston sufficient to close said upper sealing seat and open said lower sealing seat to discharge said condensate through the condensate discharge port.

3. The apparatus of claim 2 wherein at a third predetermined temperature between said first and second predetermined temperatures, said upper sealing seat and said lower sealing seat are both open.

4. The apparatus of claim 1 wherein said expansion thermostat includes a bellows arrangement.

5. The apparatus of claim 4 wherein said means for adjusting said thermostat includes
    an adjusting rod and adjusting nut coupled to adjust the preload condition of said bellows arrangement.

6. The apparatus of claim 1 including an O-ring positioned on the outer periphery of said piston for slideably and sealably mounting said piston in said lower housing.

7. The apparatus of claim 1 including a snap ring mounted on the inner lower periphery of said piston to retain said expansion thermostat in position.

8. The apparatus of claim 1 wherein said lower spring member has an operating spring force greater than the maximum spring force of the upper spring member.

9. The apparatus of claim 1 including
    an upper sealing gasket for sealably mounting the steam trap in the upper housing, and
    a lower sealing gasket for sealing mounting the steam trap between the upper and lower housing.

10. Apparatus comprising:
    a steam trap for discharging condensate at a first predetermined temperature;
    diverter valve means coupled in line to said steam trap for diverting condensate to a condensate return line port at said first temperature; and
    said diverter valve means includes a expansion thermostat for diverting condensate from said return line port to a condensate discharge port at a second predetermined temperature, greater than said first predetermined temperature.

11. A steam trap and diverter valve apparatus for use with fiberglass reinforced pipe condensate systems comprising in combination:
    an upper housing having a condensate input opening;
    a steam trap mounted in said upper housing;
    a lower housing coupled to said upper housing and retaining said steam trap in said upper housing, said lower housing having an output opening for coupling to the condensate return line, and a condensate discharge opening;
    a diverter valve mounted in said lower housing comprising a cylindrical piston slidably mounted in said lower housing, the upper portion of said piston cooperating with said lower housing to form an upper sealing seat, an upper spring member positioned within an upper portion of said piston and an upper portion of said lower housing, a liquid expansion thermostat positioned within said piston and spaced in line from said steam trap, a lower spring member positioned within lower portion of said piston and an outer portion of said thermostat, and bellows means for adjusting said thermostat;

end means for retaining said valve in said lower housing and cooperating with said piston to form a lower sealing seat; and said steam trap being set to discharge condensate at a first predetermined temperature into a cavity between said trap and said diverter valve, and at said first predetermined temperature said upper sealing seat is normally open and said lower sealing seat is normally closed, such that said condensate is discharged through said output opening.

12. The apparatus of claim 11 wherein at a second predetermined temperature said liquid expansion thermostat causes movement of said piston sufficient to close said upper sealing seat and open said lower sealing seat to discharge said condensate through the condensate discharge opening.

13. The apparatus of claim 12 wherein at a third predetermined temperature between said first and second predetermined temperatures, said upper sealing seat and said lower sealing seat are both open and condensate is discharged through said output opening and said discharge opening.

14. The apparatus of claim 13 wherein said means for adjusting said thermostat includes a bellows arrangement.

15. The apparatus of claim 14 wherein said means for adjusting said thermostat further includes
an adjusting rod and adjusting nut coupled to adjust the preload condition of said bellows arrangement.

16. The apparatus of claim 15 including an O-ring positioned on the outer periphery of said piston for slidably and sealably mounting said piston in said lower housing.

17. The apparatus of claim 16 including a snap ring mounted on the inner lower periphery of said piston to retain said liquid expansion thermostat in position.

18. The apparatus of claim 17 wherein said lower spring member has an operating spring force greater than the maximum spring force of the upper spring member.

19. The apparatus of claim 18 including
a first sealing gasket for sealing the steam trap in the upper housing adjacent in input opening, and
a second sealing gasket for sealing the steam trap between the upper and lower housing adjacent to the discharge opening.

20. Apparatus comprising in combination:
a steam trap for discharging condensate at a first predetermined temperature;
diverter valve means spaced from said steam trap and coupled in line to said steam trap for diverting condensate to a condensate return line opening at said first temperature; and
said diverter valve means includes an expansion thermostat and a piston responsive to said thermostat for diverting condensate from said return line opening to a condensate discharge opening at a second predetermined temperature, greater than said first predetermined temperature.

* * * * *